(12) United States Patent
Tomida

(10) Patent No.: US 7,813,853 B2
(45) Date of Patent: Oct. 12, 2010

(54) DAMPING FORCE CONTROL APPARATUS FOR VEHICLE

(75) Inventor: Koichi Tomida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 911 days.

(21) Appl. No.: 11/556,872

(22) Filed: Nov. 6, 2006

(65) Prior Publication Data

US 2007/0156314 A1    Jul. 5, 2007

(30) Foreign Application Priority Data

Dec. 26, 2005    (JP) .............................. 2005-371493

(51) Int. Cl.
   *B60G 21/00*    (2006.01)
(52) U.S. Cl. .................. 701/37; 701/75; 280/5.502; 280/5.506; 280/5.507; 280/6.15
(58) Field of Classification Search .................. 701/37, 701/72, 75; 280/5.5, 5.502, 5.506, 5.507, 280/6.15, 5.515; 180/218, 6.5; B60G 21/00
   See application file for complete search history.

(56) References Cited

U.S. PATENT DOCUMENTS

| | | | | |
|---|---|---|---|---|
| 5,490,068 | A * | 2/1996 | Shimizu et al. ............... | 701/38 |
| 5,802,478 | A * | 9/1998 | Iwasaki ..................... | 701/37 |
| 5,808,890 | A * | 9/1998 | Sasaki ...................... | 701/37 |
| 5,911,768 | A * | 6/1999 | Sasaki ...................... | 701/38 |
| 5,935,181 | A * | 8/1999 | Iwasaki ..................... | 701/37 |
| 5,944,763 | A * | 8/1999 | Iwasaki ..................... | 701/37 |
| 6,366,841 | B1 * | 4/2002 | Ohsaku ..................... | 701/37 |
| 7,110,870 | B2 * | 9/2006 | Tseng et al. ................. | 701/34 |
| 7,406,371 | B2 * | 7/2008 | Izawa et al. ................. | 701/37 |
| 2002/0128760 | A1 | 9/2002 | Bodie et al. | |
| 2003/0033063 | A1 * | 2/2003 | Kawashima et al. .......... | 701/37 |
| 2003/0204293 | A1 * | 10/2003 | Shiino et al. ................ | 701/37 |
| 2006/0116802 | A1 * | 6/2006 | Yamada et al. .............. | 701/37 |
| 2006/0142916 | A1 * | 6/2006 | Onuma et al. ............... | 701/38 |
| 2008/0133066 | A1 * | 6/2008 | Takenaka ................... | 701/1 |

FOREIGN PATENT DOCUMENTS

| | | |
|---|---|---|
| CN | 1781747 A | 6/2006 |
| EP | 0 306 004 A2 | 3/1989 |
| EP | 0 556 055 A2 | 8/1993 |
| EP | 0 556 055 B1 | 8/1993 |

(Continued)

*Primary Examiner*—Tuan C To
(74) *Attorney, Agent, or Firm*—Oblon, Spivak, McClelland, Maier & Neustadt, L.L.P.

(57) ABSTRACT

A damping force control apparatus for a vehicle includes adjustable-damping-force shock absorbers. When the vehicle turns, an electronic controller calculates an actual roll angle of the vehicle body in accordance with sprung accelerations detected by sprung acceleration sensors. The electronic controller also calculates a target roll angle of the vehicle body in accordance with a lateral acceleration detected by a lateral acceleration sensor. The target roll angle is set such that it increases with the lateral acceleration acting on the vehicle during turning and is uniquely determined by the lateral acceleration. The electronic controller sets target damping forces of the shock absorbers such that the actual roll angle coincides with the target roll angle, and controls the damping forces of the shock absorbers in accordance with the set target damping forces.

14 Claims, 9 Drawing Sheets

FOREIGN PATENT DOCUMENTS

| | | |
|---|---|---|
| EP | 1 623 856 A2 | 2/2006 |
| EP | 1 661 740 A1 | 5/2006 |
| GB | 2 211 153 A | 6/1989 |
| JP | 64-28017 | 1/1989 |
| JP | 2-246813 | 10/1990 |
| JP | 3-92415 | 4/1991 |
| JP | 4-95514 | 3/1992 |
| JP | 06064431 A * | 3/1994 |
| JP | 7-232537 | 9/1995 |
| JP | 09132017 A * | 5/1997 |
| JP | 3509544 | 1/2004 |

* cited by examiner

FIG.2

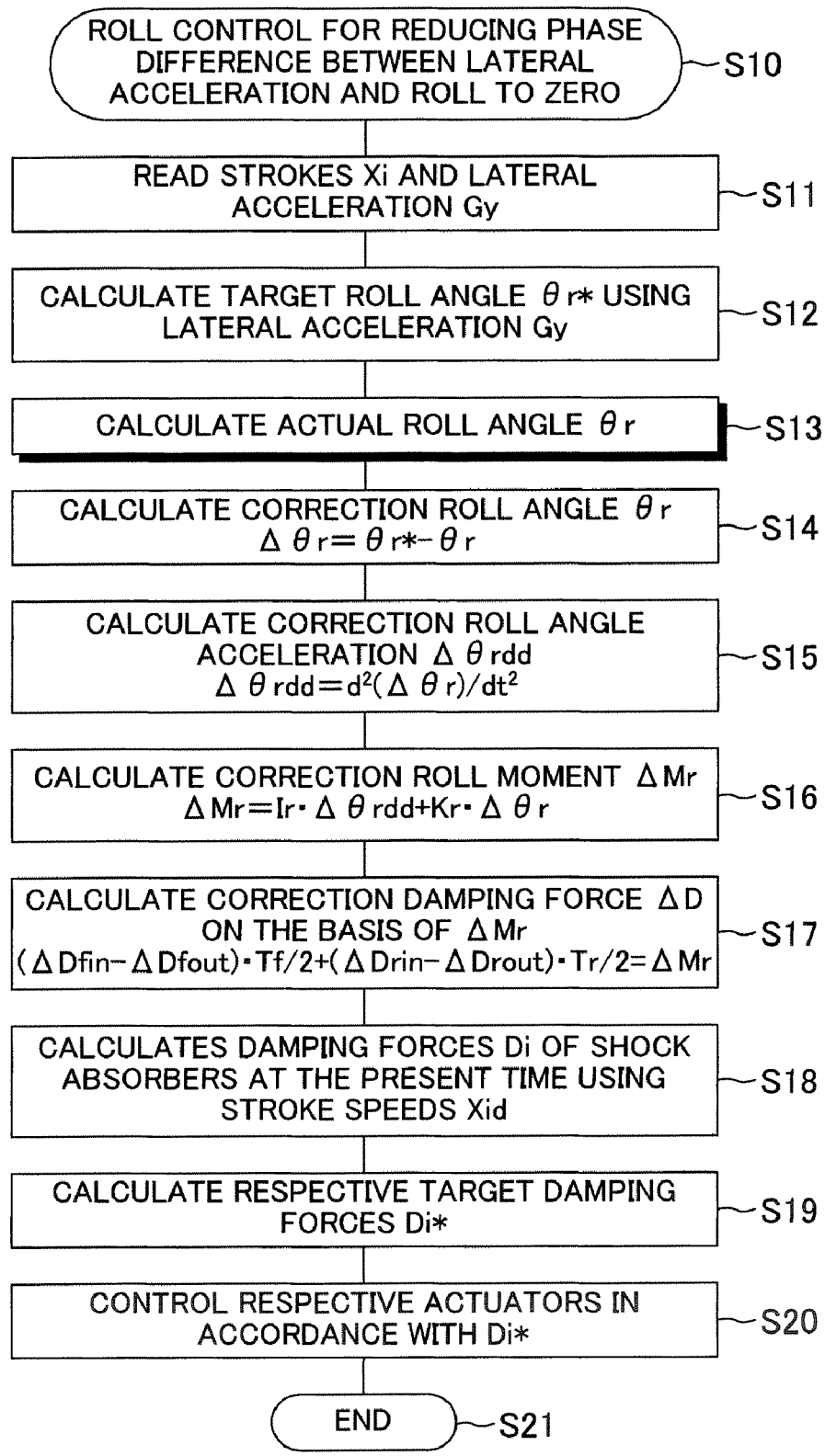

- S10: ROLL CONTROL FOR REDUCING PHASE DIFFERENCE BETWEEN LATERAL ACCELERATION AND ROLL TO ZERO
- S11: READ STROKES Xi AND LATERAL ACCELERATION Gy
- S12: CALCULATE TARGET ROLL ANGLE $\theta r*$ USING LATERAL ACCELERATION Gy
- S13: CALCULATE ACTUAL ROLL ANGLE $\theta r$
- S14: CALCULATE CORRECTION ROLL ANGLE $\theta r$
  $\Delta \theta r = \theta r* - \theta r$
- S15: CALCULATE CORRECTION ROLL ANGLE ACCELERATION $\Delta \theta rdd$
  $\Delta \theta rdd = d^2(\Delta \theta r)/dt^2$
- S16: CALCULATE CORRECTION ROLL MOMENT $\Delta Mr$
  $\Delta Mr = Ir \cdot \Delta \theta rdd + Kr \cdot \Delta \theta r$
- S17: CALCULATE CORRECTION DAMPING FORCE $\Delta D$ ON THE BASIS OF $\Delta Mr$
  $(\Delta Dfin - \Delta Dfout) \cdot Tf/2 + (\Delta Drin - \Delta Drout) \cdot Tr/2 = \Delta Mr$
- S18: CALCULATES DAMPING FORCES Di OF SHOCK ABSORBERS AT THE PRESENT TIME USING STROKE SPEEDS Xid
- S19: CALCULATE RESPECTIVE TARGET DAMPING FORCES Di*
- S20: CONTROL RESPECTIVE ACTUATORS IN ACCORDANCE WITH Di*
- S21: END

DAMPING FORCE CONTROL APPARATUS FOR VEHICLE

BACKGROUND OF THE INVENTION

1. Field of the Invention

The present invention relates to a damping force control apparatus for a vehicle equipped with adjustable-damping-force shock absorbers.

2. Description of the Related Art

Japanese Patent No. 3509544 discloses such a damping force control apparatus for a vehicle. In the disclosed damping force control apparatus, four wheels are suspended on the vehicle body via suspension systems including respective shock absorbers, and the damping forces of the shock absorbers are controlled individually in accordance with the turning conditions of the vehicle. In the damping force control apparatus, a virtual vehicle model in which a shock absorber for suppressing rising of the vehicle body and a shock absorber for suppressing rolling of the vehicle body are disposed at a virtual point on the radially inner side of a turning locus is adapted to an actual vehicle model.

In the damping force control apparatus disclosed in the patent, when the vehicle turns, the damping forces of the shock absorbers for the wheels on the radially inner side of a turning locus are set higher than those of the shock absorbers for the wheels on the radially outer side of the turning locus in order to suppress the rolling of the vehicle body while suppressing rising of the vehicle body at the wheels on the radially inner side of the turning locus. Thus, rising of the center of gravity of the vehicle during turning is suppressed, whereby rolling of the vehicle body can be suppressed, and steerability during turning can be improved.

However, the damping force control apparatus disclosed in the patent does not take into consideration the phase difference (time difference) between a lateral acceleration acting on the vehicle and a corresponding change in the posture of the vehicle body; for example, rolling of the vehicle body. Therefore, in some cases, after generation of a lateral acceleration, the posture of the vehicle body changes with a considerable time lag. In such a case, satisfactory riding comfort cannot be ensured during turning.

SUMMARY OF THE INVENTION

The present invention has been achieved to solve the above problems, and an object of the invention is to provide a damping force control apparatus which improves riding comfort during turning by controlling the damping force of each shock absorber in consideration of the phase difference between lateral acceleration acting on the vehicle and change in the posture of the vehicle body while the vehicle is turning.

In order to achieve the above object, the present invention provides an improved damping force control apparatus for a vehicle in which four wheels are suspended by respective suspension systems including respective shock absorbers, and damping forces of the shock absorbers are controlled individually in accordance with turning conditions of the vehicle. The damping force control apparatus comprises posture detection means for detecting the posture of the vehicle during turning; lateral acceleration detection means for detecting a lateral acceleration acting on the vehicle during turning; target-posture setting means for setting a target posture of the vehicle body during turning in accordance with the lateral acceleration detected by the lateral acceleration detection means; target-damping-force setting means for setting target damping forces which the shock absorbers are required to generate so as to render the posture of the vehicle body detected by the posture detection means coincident with the target posture set by the target-posture setting means; and damping-force control means for controlling the damping forces of the shock absorbers in accordance with the target damping forces set by the target-damping-force setting means.

In this damping force control apparatus, the target posture of the vehicle body during turning is set in accordance with the lateral acceleration detected by the lateral acceleration detection means; the target damping forces which the shock absorbers are required to generate are set such that the posture of the vehicle body coincides with the set target posture; and the damping forces of the shock absorbers are controlled in accordance with the target damping forces. Therefore, the phase of lateral acceleration acting on the vehicle and the phase of a corresponding posture change of the vehicle body can be rendered equal to each other, whereby riding comfort of the vehicle during turning can be improved.

The posture detection means may be configured to detect an actual roll angle of the vehicle body about a longitudinal axis of the vehicle, and the target-posture setting means may be configured to set a target roll angle of the vehicle body about the longitudinal axis which increases with the detected lateral acceleration and is uniquely determined by the lateral acceleration. In this case, the target-damping-force setting means preferably includes correction-roll-moment calculation means for calculating a correction roll moment, which is required to be produced in the vehicle body, in accordance with a difference between the set target roll angle of the vehicle body and the detected actual roll angle of the vehicle body; and inner-and-outer-wheels target damping force calculation means for calculating a target damping force of the shock absorbers corresponding to the wheels located on the inner side of a turning locus and a target damping force of the shock absorbers corresponding to the wheels located on the outer side of the turning locus such that the calculated correction roll moment decreases.

By virtue of this configuration, the phase of lateral acceleration acting on the vehicle during turning and the phase of rolling, which is one posture change of the vehicle body, can be rendered equal to each other, whereby an improved rolling sensation (sensation of smooth rolling) can be provided to a driver.

Alternatively, the posture detection means may be configured to detect an actual pitch angle of the vehicle body about a lateral axis of the vehicle, and the target-posture setting means may be configured to set a target pitch angle of the vehicle body about the lateral axis which increases with the detected lateral acceleration and is uniquely determined by the lateral acceleration. In this case, the target-damping-force setting means preferably includes correction-pitch-moment calculation means for calculating a correction pitch moment, which is required to be produced in the vehicle body, in accordance with a difference between the set target pitch angle of the vehicle body and the detected actual pitch angle of the vehicle body; and front-and-rear-wheels target damping force calculation means for calculating a target damping force of the shock absorbers corresponding to the front wheels and a target damping force of the shock absorbers corresponding to the rear wheels such that the calculated correction pitch moment decreases.

By virtue of this configuration, the phase of lateral acceleration acting on the vehicle during turning and the phase of pitching, which is one posture change of the vehicle body, can be rendered equal to each other, whereby an improved pitching sensation (sensation of smooth pitching) can be provided to a driver.

Alternatively, the posture detection means may be configured to detect an actual roll angle of the vehicle body about a longitudinal axis of the vehicle and an actual pitch angle of the vehicle body about a lateral axis of the vehicle, and the target-posture setting means may be configured to set a target roll angle of the vehicle body about the longitudinal axis which increases with the detected lateral acceleration and is uniquely determined by the lateral acceleration and a target pitch angle of the vehicle body about the lateral axis which increases with the detected lateral acceleration and is uniquely determined by the lateral acceleration. In this case, the target-damping-force setting means preferably includes the above-described correction-roll-moment calculation means, the above-described correction-pitch-moment calculation means, the above-described inner-and-outer-wheels target damping force calculation means, and the above-described front-and-rear-wheels target damping force calculation means. Further, the target-posture setting means may be configured to directly set the target pitch angle of the vehicle body on the basis of the detected lateral acceleration, or configured to indirectly set the target pitch angle of the vehicle body on the basis of the set target roll angle.

By virtue of this configuration, it becomes possible to render the phase of rolling of the vehicle body and the phase of pitching of the vehicle equal to each other, while rendering the phase of lateral acceleration acting on the vehicle during turning and the phase of rolling of the vehicle body equal to each other. Thus, it becomes possible to improve the pitching sensation as well as the rolling sensation during turning.

The target-damping-force setting means may include jack-up-force calculation means for calculating a jack-up force acting from the suspension system to the vehicle body during turning, and jack-up-corresponding-target-damping-force calculation means for calculating the target damping forces in consideration of the jack-up force calculated by the jack-up-force calculation means. In this case, preferably, the jack-up-force calculation means calculates a rear-wheel-side jack-up force acting from the rear-wheel side suspension systems to the vehicle body during turning, and the jack-up-corresponding-target-damping-force calculation means calculates, as a rear-wheel-side target damping force, a force which cancels the calculated rear-wheel-side jack-up force.

When the vehicle turns, in general, a jack-up force (a force which raises the vehicle body) stemming from the geometry change of suspension systems by the lateral force generated in the wheels acts on the vehicle body. Accordingly, if a jack-up force acting on the vehicle body during turning is calculated, the target damping forces are set in consideration of the calculated jack-up force, and the damping forces of the respective shock absorbers are controlled in accordance with the set target damping forces, it becomes possible to maintain the vehicle body in a front-lowered posture (a state in which the front of the vehicle body is lowered), while maintaining the rear-wheel side vertical displacement of the vehicle body at zero. Therefore, it is possible to improve the steering stability of the vehicle, while improving the riding comfort of the vehicle during turning as described above.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 2 is a flowchart relating to the first to third embodiments and the modifications of the first embodiment, and showing a roll control program executed by an electronic controller shown in FIG. 1;

DESCRIPTION OF THE PREFERRED EMBODIMENTS

First Embodiment

Figure 1:
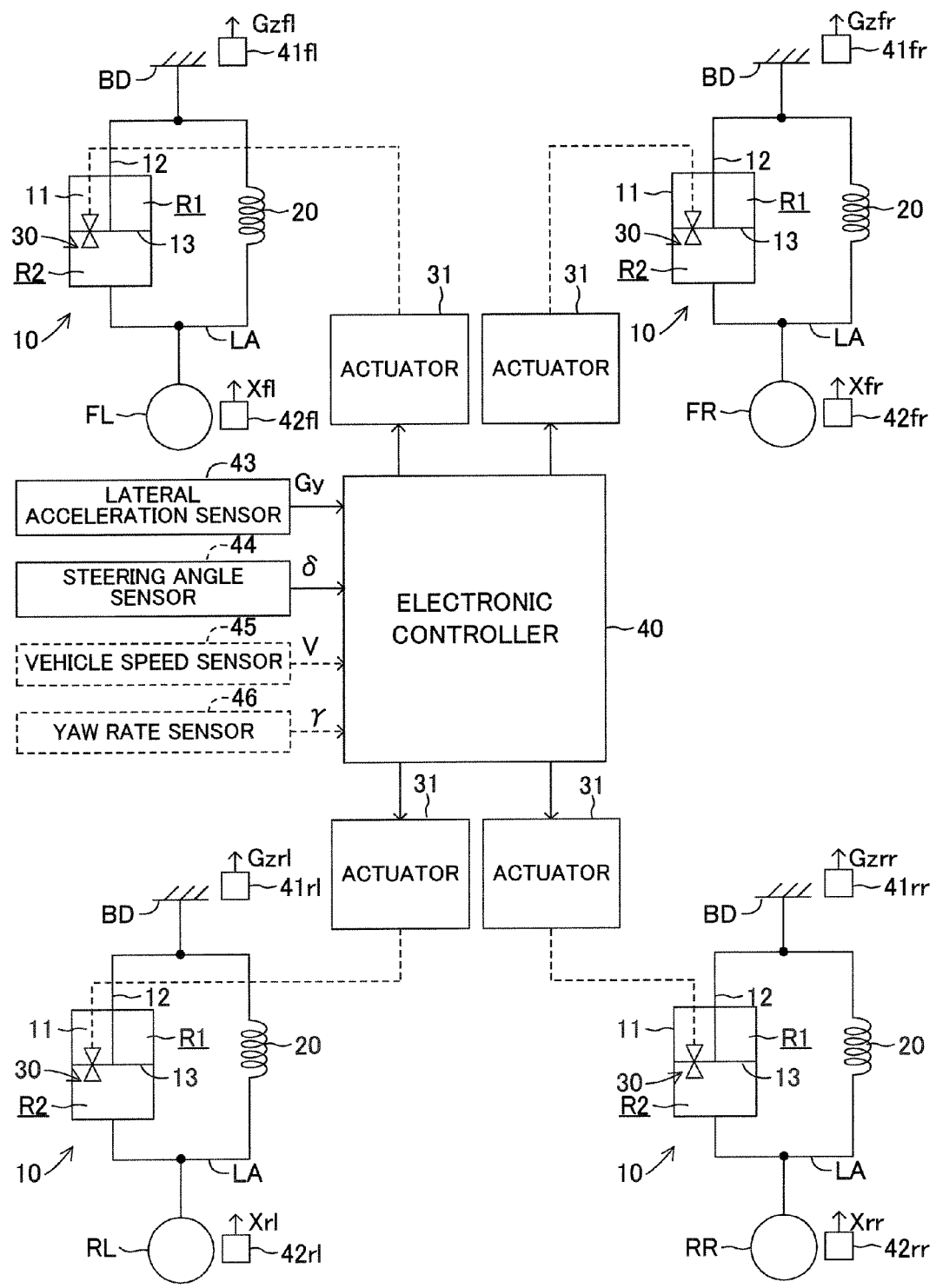
FIG. 1 is a schematic diagram relating to first to third embodiments of the present invention and modifications of the first embodiment, and showing the overall configuration of a damping force control apparatus for a vehicle.

A first embodiment of the present invention will be described below with reference to the drawings. FIG. 1 is a schematic diagram showing the overall configuration of a damping force control apparatus for a vehicle according to the first embodiment. The damping force control apparatus includes a suspension system provided between a vehicle body BD (sprung member), and each of a front left wheel FL, a front right wheel FR, a rear left wheel RL, and a rear right wheel RR. The suspension system includes a shock absorber 10, a coil spring 20, and a lower arm LA (unsprung member).

The shock absorber 10 is interposed between the vehicle body BD, and each of the lower arms LA connected to the front left wheel FL, the front right wheel FR, the rear left wheel RL, and the rear right wheel RR. The shock absorber 10 is connected to the corresponding lower arm LA at the lower end of a cylinder 11, and is connected to the vehicle body BD at the upper end of a piston rod 12 which is inserted into the cylinder 11 in a vertically movable manner. The coil spring 20 is disposed parallel to the shock absorber 10. The lower arm LA, an unillustrated upper arm, an unillustrated knuckle, etc., constitute a link mechanism for connecting the front left wheel FL, the front right wheel FR, the rear left wheel RL, and the rear right wheel RR to the vehicle body BD.

The cylinder 11 is divided into an upper chamber R1 and a lower chamber R2 by a piston 13 which liquid-tightly slides on the inner circumferential surface of the cylinder 11. The piston 13 is provided with a variable throttle mechanism 30. The degree of throttling of the variable throttle mechanism 30 is controlled by means of an actuator 31, which partially constitutes the variable throttle mechanism 30, whereby the opening of a communication passage between the upper and lower chambers R1 and R2 of the cylinder 11 is changed stepwise or switched to an arbitrary degree of opening. When the opening of the communication passage increases as a result of the switching, the damping force of the shock absorber 10 is set to the soft side. When the opening of the passage decreases as a result of the switching, the damping force of the shock absorber 10 is set to the hard side.

Next, there will be described an electronic control apparatus which controls operation of the actuator 31. The electronic control apparatus includes an electronic controller 40. The electronic controller 40 is mainly composed of a microcomputer formed of a CPU, ROM, RAM, and the like. The electronic controller 40 repeatedly performs a roll control program shown in FIG. 2 at predetermined time intervals after an ignition switch is turned ON, so as to control operation of the actuator 31. The electronic controller 40 is connected to sprung acceleration sensors 41fl, 41fr, 41rl, and 41rr, vehicle height sensors 42fl, 42fr, 42rl, and 42rr, a lateral acceleration sensor 43, and a steering angle sensor 44.

The sprung acceleration sensors 41fl, 41fr, 41rl, and 41rr are provided to the vehicle body BD at positions corresponding to the front left wheel FL, the front right wheel FR, the rear left wheel RL, and the rear right wheel RR. They respectively detect vertical sprung accelerations Gzfl, Gzfr, Gzrl, and Gzrr acting on the vehicle body BD at the sensor mounting positions in relation to the absolute space. When the sprung acceleration Gzfl (Gzfr, Gzrl, Gzrr) detected by the sprung acceleration sensor 41fl (41fr, 41rl, 41rr) is positive, it means that an upward acceleration acts on the vehicle; and when the sprung acceleration is negative, it means that a downward acceleration acts on the vehicle. The vehicle height sensors 42fl, 42fr, 42rl, and 42rr are provided between the vehicle body BD and the corresponding lower arms LA connected to the front left wheel FL, the front right wheel FR, the rear left wheel RL, and the rear right wheel RR, respectively. They respectively detect relative displacements (strokes) Xfl, Xfr, Xrl, and Xrr of the front left wheel FL, the front right wheel FR, the rear left wheel RL, and the rear right wheel RR in relation to the vehicle body BD. When the stroke Xfl (Xfr, Xrl, Xrr) detected by the vehicle height sensor 42fl (42fr, 42rl, 42rr) is positive, it means that the distance between the lower arm LA and the vehicle body BD is decreased from an initial distance; and when the stroke is negative, it means that the distance between the lower arm LA and the vehicle body BD is increased from the initial distance.

The lateral acceleration sensor 43 detects a lateral acceleration Gy in the lateral direction of the vehicle. When the lateral acceleration Gy detected by the lateral acceleration sensor 43 is positive, it means that a rightward acceleration acts on the vehicle; and when the lateral acceleration Gy is negative, it means that a leftward acceleration acts on the vehicle. The steering angle sensor 44 detects the steering angle δ of an unillustrated steering wheel. When the steering angle δ is positive, it represents a counterclockwise steering angle produced as a result of counterclockwise turning of the steering wheel; and when the steering angle δ is negative, it represents a clockwise steering angle produced as a result of clockwise turning of the steering wheel.

Next, operation of the first embodiment having the above-described configuration will be described. When a driver turns the ignition switch ON by use of an ignition key, the electronic controller 40 repeatedly performs the roll control program shown in FIG. 2 at predetermined short time intervals.

The roll control program controls the rolling of the vehicle body BD such that the phase difference between the lateral acceleration Gy acting on the vehicle and the rolling of the vehicle body BD becomes zero. The CPU starts the program at Step S10. It then proceeds to Step S11 so as to read the strokes Xi (i=fl, fr, rl, and rr) of the front left wheel FL, the front right wheel FR, the rear left wheel RL, and the rear right wheel RR in relation to the vehicle body BD, which are detected by the vehicle height sensors 42fl, 42fr, 42rl, and 42rr, respectively. Further, the CPU reads the lateral acceleration Gy of the vehicle detected by the lateral acceleration sensor 43, and then proceed to Step S12.

Figure 4:
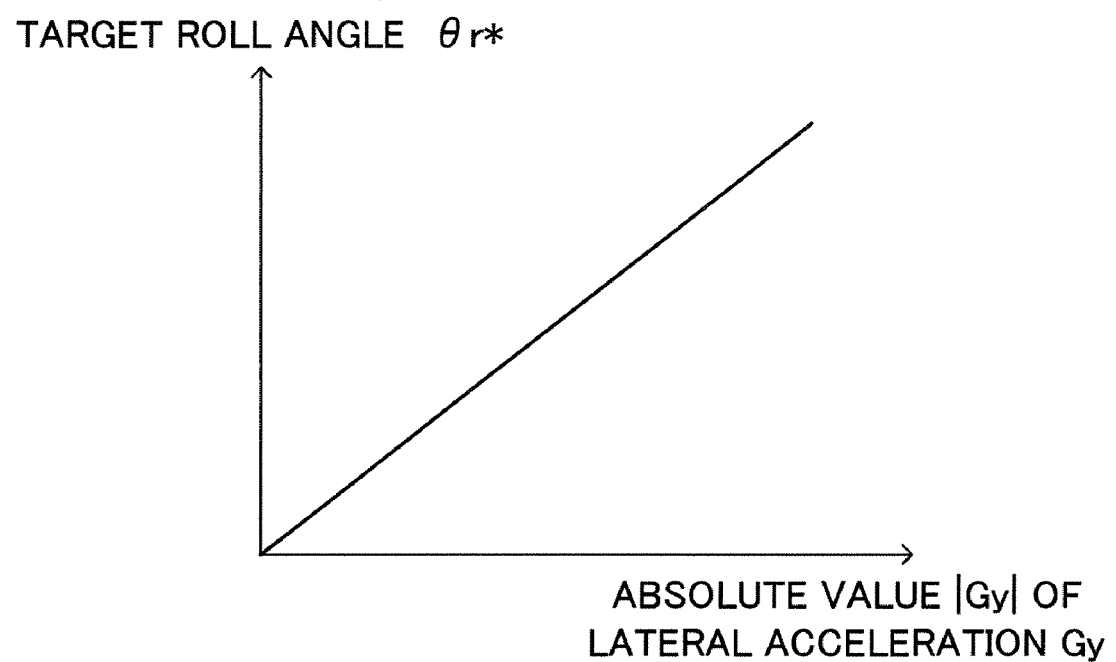
FIG. 4 is a graph relating to the first to third embodiments and the modifications of the first embodiment, and showing a change in target roll angle with lateral acceleration, which is stored in a target roll angle table provided in the electronic controller.

In Step S12, the CPU calculates a target roll angle θr* by use of the lateral acceleration Gy of the vehicle detected by the lateral acceleration sensor 43. Specifically, the CPU calculates the target roll angle θr* of the vehicle body BD, which changes depending on the absolute value |Gy| of the lateral acceleration Gy, with reference to a target roll angle table stored in the ROM in the electronic controller 40. As shown in FIG. 4, the target roll angle table defines the target roll angle θr* which is uniquely determined on the basis of the lateral acceleration Gy acting on the vehicle during turning of the vehicle. The target roll angle θr* increases linearly with the lateral acceleration Gy. Notably, the target roll angle θr* may be calculated by use of a function instead of or in addition to the target roll angle table. The function represents the target roll angle θr* which changes in accordance with the lateral acceleration Gy.

Figure 3:
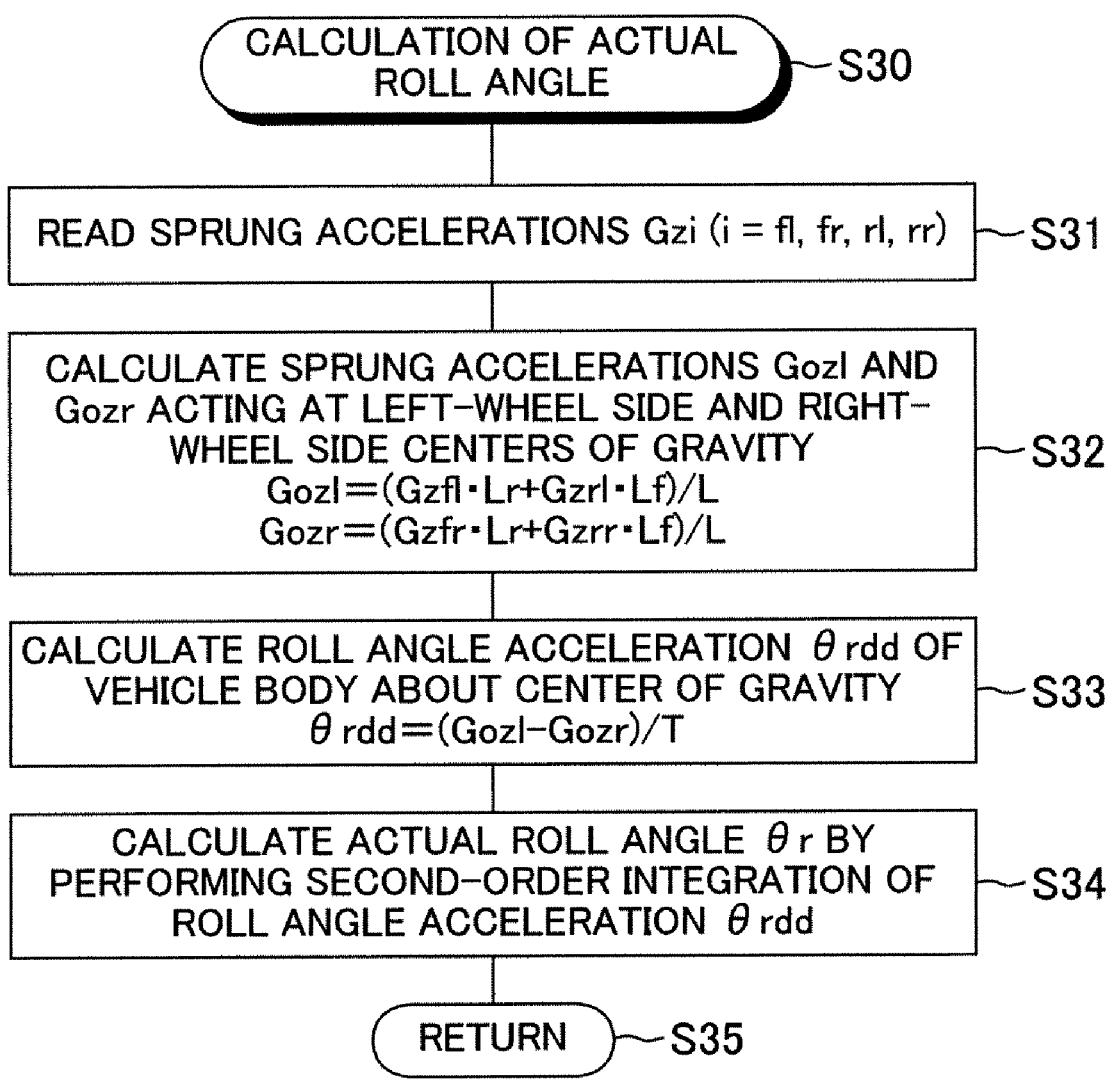
FIG. 3 is a flowchart relating to the first to third embodiments and the modifications of the first embodiment, and showing an actual roll-angle calculation program executed by the electronic controller shown in FIG. 1.

After the processing in Step S12, the CPU proceeds to Step S13 and executes an actual roll-angle calculation program to calculate an actual roll angle θr. The actual roll-angle calculation program is designed to calculate an actual roll angle, which is one physical quantity representing the posture of the vehicle body BD during turning of the vehicle. As shown in FIG. 3, the CPU starts the program at Step S30. It then proceeds to Step S31 so as to read the sprung accelerations Gzfl, Gzfr, Gzrl, and Gzrr detected by the sprung acceleration sensors 41fl, 41fr, 41rl, and 41rr.

In Step S32, the CPU calculate, by uses the following Equations (1) and (2), a sprung acceleration Gozl acting at the left-wheel side center of gravity of the vehicle body BD, and a sprung acceleration Gozr acting at the right-wheel side center of gravity of the vehicle body BD:

$$Gozl=(Gzfl \cdot Lr+Gzrl \cdot Lf)/L \quad (1)$$

$$Gozr=(Gzfr \cdot Lr+Gzrr \cdot Lf)/L \quad (2)$$

where L represents the wheel base of the vehicle, Lf represents a distance between a front wheel axle and the center of gravity of the vehicle body BD in a horizontal plane, and Lr represents a distance between a rear wheel axle and the center of gravity of the vehicle body BD in the horizontal plane.

In Step S33, the CPU calculates, by use of the following Equation (3), a roll angle acceleration θrdd of the vehicle about a longitudinal axis which passes through the center of gravity of the vehicle body BD:

$$\theta rdd=(Gozl-Gozr)/T \quad (3)$$

where T represents the wheel tread of the vehicle. In Step S34, the CPU calculates the actual roll angle θr by performing second-order time integration of the roll angle acceleration θrdd calculated by use of Equation (3). When the actual roll angle θr is positive, it means that the vehicle body BD rolls to the right; and when the actual roll angle or is negative, it means that the vehicle body BD rolls to the left. After the processing in Step S34, the CPU proceeds to Step S35 and ends the current execution of this actual roll-angle calculation program.

The CPU returns to the roll control program shown in FIG. 2. After the processing in Step S13, the CPU proceeds to Step S14 and calculates a correction roll angle Δθr by subtracting the actual roll angle θr from the target roll angle θr* (Δθr=θr*−θr). Next, the CPU proceeds to Step S15 and calculates a correction roll angle acceleration Δθrdd by performing second order time-differentiation of the correction roll angle Δθr (Δθrdd=d²(Δθr)/dt²).

After the processing in Step S15, the CPU proceeds to Step S16 and to use the following Equation (4) so as to calculate a correction roll moment ΔMr required to correct a roll angle:

$$\Delta Mr = Ir \cdot \Delta\theta rdd + Kr \cdot \Delta\theta r \quad (4)$$

where Ir represents the inertia moment of the vehicle about the longitudinal axis which passes through the center of gravity of the vehicle body BD. Kr represents roll stiffness. The sign of ΔMr is positive when the direction of ΔMr is the same as the direction in which the roll angle increases, while is negative when the direction of ΔMr is the same as the direction in which the roll angle decreases.

After the processing in Step S16, the CPU proceeds to Step S17 and distributes the correction roll moment ΔMr to the front and rear sides of the vehicle by use of the following Equation (5). Thus, the correction roll moment ΔMr is represented as the sum of roll moments to be generated on the front and rear sides of the vehicle.

$$(\Delta Dfin - \Delta Dfout) \cdot Tf/2 + (\Delta Drin - \Delta Drout) \cdot Tr/2 = \Delta Mr \quad (5)$$

In Equation (5), Tf and Tr represent the wheel treads of the front wheels and the rear wheels, respectively. ΔDfin and ΔDfout represent correction damping forces required for the shock absorber 10 for the front wheel on the radially inner side of the turning locus and for the shock absorber 10 for the front wheel on the radially outer side of the turning locus, respectively. ΔDrin and ΔDrout represent correction damping forces required for the shock absorber 10 for the rear wheel on the radially inner side of the turning locus and for the shock absorber 10 for the rear wheel on the radially outer side of the turning locus. When the correction damping force ΔDfin (ΔDfout, ΔDrin, ΔDrout) is positive, a resultant upward force acts on the vehicle body BD. When the correction damping force ΔDfin (ΔDfout, ΔDrin, ΔDrout) is negative, a resultant downward force acts on the vehicle body BD.

In the first embodiment, the same or equal correction damping force is provided for all the shock absorbers 10. That is, the magnitudes of the respective correction damping forces of the shock absorbers 10 are assumed to be ΔD, and the correction damping force ΔD is calculated by use of the following Equation (6) or (7) in place of the above Equation (5). Therefore, the correction damping force ΔD is represented by the following Equation (8).

$$\{(\Delta D - (-\Delta D))\} \cdot Tf/2 + \{(\Delta D - (-\Delta D))\} \cdot Tr/2 = \Delta Mr \quad (6)$$

$$\{(-\Delta D) - \Delta D\} Tf/2 + \{(-\Delta D) - \Delta D\} \cdot Tr/2 = -\Delta Mr \quad (7)$$

$$\Delta D = \Delta Mr/(Tf + Tr) \quad (8)$$

Equation (6) is applied to the case where the vehicle is traveling while turning leftward, and the correction roll moment ΔMr is positive. In such a case, in order to allow further rolling to the right (the roll-angle increasing direction), the shock absorbers 10 corresponding to the front left wheel FL and the rear left wheel RL located on the inner side of the turning locus are required generate a positive correction damping force ΔD, and the shock absorbers 10 corresponding to the front right wheel FR and the rear right wheel RR located on the outer side of the turning locus are required to generate a negative correction damping force −ΔD. Equation (6) is also applied to the case where the vehicle is traveling while turning rightward, and the correction roll moment ΔMr is positive. In such a case, in order to allow further rolling to the left (the roll-angle increasing direction), the shock absorbers 10 corresponding to the front right wheel FR and the rear right wheel RR located on the inner side of the turning locus are required to generate a positive correction damping force ΔD, and the shock absorbers 10 corresponding to the front left wheel FL and the rear right wheel RL located on the outer side of the turning locus are required to generate a negative correction damping force −ΔD.

On the other hand, Equation (7) is applied to the case where the vehicle is traveling while turning leftward and the correction roll moment ΔMr is negative. In such a case, in order to restrict rolling to the right (the roll-angle increasing direction), the shock absorbers 10 corresponding to the front left wheel FL and the rear left wheel RL located on the inner side of the turning locus are required to generate a negative correction damping force −ΔD, and the shock absorbers 10 corresponding to the front right wheel FR and the rear right wheel RR located on the outer side of the turning locus are required to generate a positive correction damping force ΔD. Equation (7) is also applied to the case where the vehicle is traveling while turning rightward and the correction roll moment ΔMr is negative. In such a case, in order to restrict rolling in the left (the roll-angle increasing direction), the shock absorbers 10 corresponding to the front right wheel FR and the rear right wheel RR located on the inner side of the turning locus are required to generate a negative correction damping force −ΔD, and the shock absorbers 10 corresponding to the front left wheel FL and the rear right wheel RL located on the outer side of the turning locus are required to generate a positive correction damping force ΔD.

Figure 5:
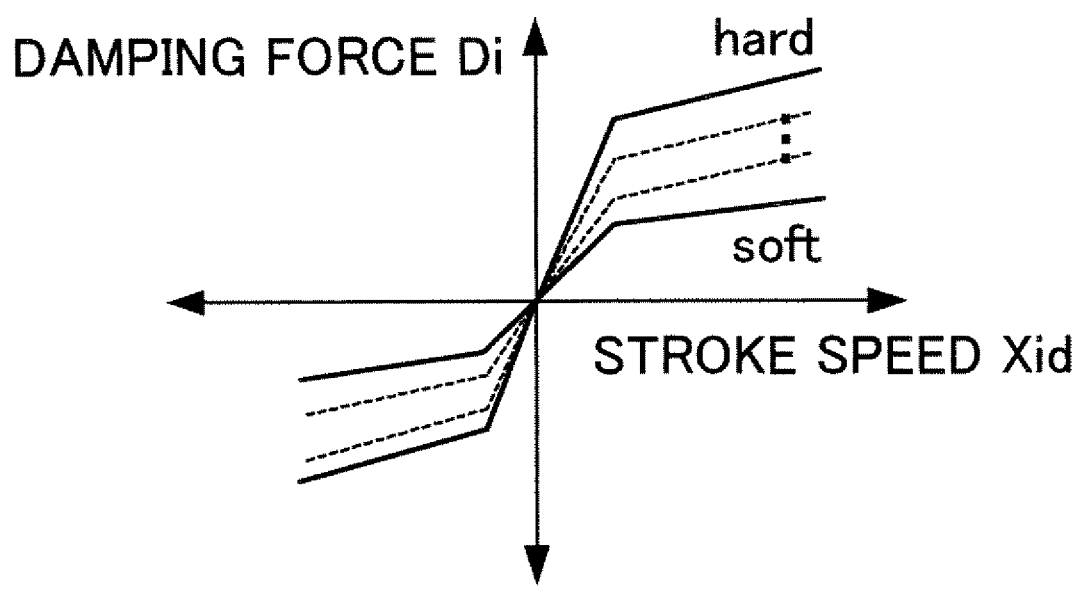
FIG. 5 is a graph relating to the first to third embodiments and the modifications of the first embodiment, and showing a change in damping force with stroke speed, which is stored in a damping force table provided in the electronic controller.

After the processing in Step S17, the CPU proceeds to Step S18 and calculates stroke speeds Xid (i=fl, fr, rl, and rr) through time-differentiation of the strokes Xi (i=fl, fr, rl, and rr) of the front left, front right, rear left, and rear right wheels FL, FR, RL, and RR relative to the vehicle body BD. The CPU then calculates the damping forces Di (i=fl, fr, rl, and rr) of the respective shock absorbers 10 at the present time by use of the calculated stroke speeds Xid and, for example, detection signals indicating the degrees of throttling of the variable throttle mechanisms 30. Specifically, the CPU calculates the damping force Di of each shock absorber 10, which varies in accordance with the stroke speed Xid, with reference to a damping force table stored in the ROM in the electronic controller 40. As shown in FIG. 5, this damping force table stores a damping force Di of the shock absorber 10, which increases as the stroke speed Xid increases from zero to a predetermined positive value, and a damping force Di of the shock absorber 10, which decreases as the stroke speed Xid decreases from zero to a predetermined negative value, for each of representative degrees of throttling of the variable throttle mechanism 30. For the same stroke speed Xid, the damping force Di increases from the soft side to the hard side as the degree of throttling of the variable throttle mechanism 30 increases.

Next, the CPU proceeds to Step S19 so as to set a target damping force Di* of the shock absorber 10 in accordance with the following Equation (9) by using the damping force Di of the shock absorber 10 calculated in Step S18.

$$Di^* = Di \pm \Delta D (i=fl, fr, rl, rr) \quad (9)$$

In the above Equation (9), when the correction roll moment $\Delta Mr$ is positive, the target correction damping force Di* for the wheels located on the inner side of the turning locus is calculated as (Di+$\Delta D$), while the target correction damping force Di* for the wheels located on the outer side of the turning locus is calculated as (Di−$\Delta D$). By contrast, when the correction roll moment $\Delta Mr$ is negative, the target correction damping force Di* for the wheels located on the inner side of the turning locus is calculated as (Di−$\Delta D$), while the target correction damping force Di* for the wheels located on the outer side of the turning locus is calculated as (Di+$\Delta D$).

Next, the CPU proceeds to Step S20 and controls the operations of the corresponding actuators 31 in accordance with the target damping forces Di* set in Step S19, thereby adjusting the degrees of throttling of the corresponding variable throttle mechanisms 30. After the processing in Step S20, the CPU proceeds to Step S21 so as to end the current execution of the roll control program.

In this first embodiment, the target roll angle $\theta r^*$ of the vehicle body BD during turning is set by means of the processing in Step S12 in accordance with the lateral acceleration Gy detected by the lateral acceleration sensor 43. In order to render the actual roll angle $\theta r$ of the vehicle body BD obtained as a result of the processing in Step S13 coincident with the set target roll angle $\theta r^*$, the target damping forces Di* of the shock absorbers 10 are set by means of the processing in Steps S14 to S19, and then the damping forces Di of the shock absorbers 10 are controlled by means of the processing in Step S20 in accordance with the set target damping forces Di*. By virtue of this control, the phase of the lateral acceleration Gy acting on the vehicle and the phase of the rolling of the vehicle body BD coincide with each other during turning, whereby an improved rolling sensation (sensation of smooth rolling) can be provided to a driver during turning.

First Modification of First Embodiment

In the above-described first embodiment, when the processing of Step S17 is executed, Equation (6) are (7) are used in place of Equation (5). Therefore, the correction damping force $\Delta D$ can be obtained simply. However, the method of obtaining the correction damping forces is not limited thereto. For example, the correction damping forces $\Delta Dfin$ to $\Delta Drout$ may be obtained as follow. The rest of the first modification of the first embodiment is the same as the first embodiment, and therefore, will not be described repeatedly.

In this first modification of the first embodiment, the same or equal correction damping coefficient is provided for all the shock absorbers 10 of the four wheels. That is, the magnitude of the correction damping coefficient is assumed to be $\Delta C$, the above Equation (5) is replaced with the following Equation (10), and the correction damping force coefficient $\Delta C$ is calculated by use of the following Equation (11). Thus, the correction damping forces $\Delta Dfin$ to $\Delta Drout$ are represented by the following Equations (12) to (15):

$$(\Delta C \cdot Xfind - \Delta C \cdot Xfoutd) \cdot Tf/2 + \quad (10)$$
$$(\Delta C \cdot Xrind - \Delta C \cdot Xroutd) \cdot Tr/2 = \Delta Mr$$

-continued
$$\Delta C = 2\Delta Mr / \{(Xfind - Xfoutd) \cdot Tf + (Xrind - Xroutd) \cdot Tr\} \quad (11)$$

$$\Delta Dfin = \Delta C \cdot Xfind \quad (12)$$

$$\Delta Dfout = \Delta C \cdot Xfoutd \quad (13)$$

$$\Delta Drin = \Delta C \cdot Xrind \quad (14)$$

$$\Delta Drout = \Delta C \cdot Xroutd \quad (15)$$

where Xfind, Xfoutd, Xrind, and Xroutd represent the stroke speeds of the front wheel on the radially inner side of the turning locus, the front wheel on the radially outer side of the turning locus, the rear wheel on the radially inner side of the turning locus, and the rear wheel on the radially outer side of the turning locus, respectively. These are calculated on the basis of the stroke speeds Xid (i=fl, fr, rl, and rr) corresponding to the front left wheel FL, the front right wheel FR, the rear left wheel RL, and the rear right wheel RR, respectively, in consideration of the polarities (directions) of the steering angle 6 and the lateral acceleration G.

After the processing in Step S17, as in the case of the above-described first embodiment, the CPU proceeds to Step S18 so as to calculate the damping forces Di of the shock absorbers 10 at the present time. The CPU then proceeds to Step S19 so as to calculate the target damping forces Di* by adding the correction damping forces $\Delta Dfin$ to $\Delta Drout$ to the damping forces Di. After the processing in Step S19, the CPU proceeds to Step S20 and controls the operations of the corresponding actuators 31 in accordance with the target damping forces Di*, thereby adjusting the degrees of throttling of the corresponding variable throttle mechanisms 30. After the processing in Step S20, the CPU proceeds to Step S21 so as to end the current execution of the roll control program. In this first modification of the first embodiment, as in the case of the above first embodiment, rolling sensation during turning can be improved.

Second Modification of First Embodiment

In the above-described first modification of the first embodiment, when the processing of Step S17 is executed, Equation (10) is used in place of Equation (5). Therefore, the correction damping forces $\Delta Dfin$ to $\Delta Drout$ can be obtained simply. However, the method of obtaining the correction damping forces is not limited thereto. For example, the correction damping forces $\Delta Df$ and $\Delta Dr$ may be obtained as follow. The rest of the second modification of the first embodiment is the same as the first embodiment, and therefore, will not be described repeatedly.

In this second modification of the first embodiment, roll damping factors $\zeta$ at the front and rear sections of the vehicle are rendered equal to each other to provide the same or equal correction damping force for the shock absorbers 10 of the front right and left wheels of the vehicle. That is, when the correction damping forces of the shock absorbers 10 of the front right and front left wheels are assumed to be $\Delta Df$, and the correction damping forces of the shock absorbers 10 of the rear right and rear left wheels are assumed to be $\Delta Dr$, the correction damping forces $\Delta Df$ and $\Delta Dr$ are calculated by making use of the following Equations (20) and (21) in place of the above Equation (5). First, since the roll damping factors $\zeta$ at the front and rear sections of the vehicle are rendered equal, the following Equation (16) is obtained.

$$\zeta = \frac{\Delta Mrf}{2\sqrt{Irf \times Krf}} = \frac{\Delta Mrr}{2\sqrt{Irr \times Krr}} \quad (16)$$

In Equation (16), ΔMrf and ΔMrr represent front-wheel side and rear-wheel side correction roll moments, respectively. The relation ΔMrf+ΔMrr=ΔMr holds. Irf and Irr represent front-wheel side and rear-wheel side roll inertia moments, respectively. The relation Irf+Irr=Ir holds. Further, Krf and Krr represent front-wheel side and rear-wheel side roll stiffnesses, respectively. The relation Krf+Krr=Kr holds.

Next, the ratio of the correction roll moment ΔMrf on the front wheel side to the correction roll moment ΔMrr on the rear wheel side is assumed to be λ. In this case, a correction roll moment ratio λ is represented by the following Equation (17).

$$\lambda = \frac{\Delta Mrf}{\Delta Mrr} = \sqrt{\frac{Irf \times Krf}{Irr \times Krr}} = \sqrt{\frac{hf^2 \times mf \times Krf}{hr^2 \times mr \times Krr}} \quad (17)$$

In Equation (17), hf and hr represent front-wheel side and rear-wheel side roll arm lengths, respectively; and mf and mr represent front-wheel side and rear-wheel side masses of the vehicle body BD, respectively. On the basis of the above Equation (17), the front-wheel side roll moment ΔMrf is represented by the following Equation (18), and the rear-wheel side roll moment ΔMrr is represented by the following Equation (19).

$$\Delta Mrf = \Delta Mr \cdot \lambda/(\lambda+1) \quad (18)$$

$$\Delta Mrr = \Delta Mr/(\lambda+1) \quad (19)$$

On the basis of the above Equation (18), the correction damping force ΔDf of the shock absorbers 10 of the front left and front right wheels is represented by the following Equation (20). On the basis of the above Equation (19), the correction damping force ΔDr of the shock absorbers 10 of the rear left and rear right wheels is represented by the following Equation (21).

$$\Delta Df = \Delta Mrf/Tf \quad (20)$$

$$\Delta Dr = \Delta Mrr/Tr \quad (21)$$

After the processing in Step S17, as in the case of the above first embodiment, the CPU proceeds to Step S18 so as to calculate the damping forces Di of the shock absorbers 10 at the present time. The CPU then proceeds to Step S19 so as to calculate the respective target damping forces Di* by adding the correction damping forces ΔDf and ΔDr to the damping forces Di, or subtracting the correction damping forces ΔDf and ΔDr from the damping forces Di, depending on the directions of the correction roll moments ΔMrf and ΔMrr, respectively. After the processing in Step S19, the CPU proceeds to Step S20 and controls the operations of the corresponding actuators 31 in accordance with the target damping forces Di*, thereby adjusting the degrees of throttling of the corresponding variable throttle mechanisms 30. After the processing in Step S20, the CPU proceeds to Step S21 so as to end the current execution of the roll control program. In the second modification of the first embodiment, as in the case of the above-described first embodiment, rolling sensation during turning can be improved.

Third Modification of First Embodiment

In the above-described second modification of the first embodiment, when the processing of Step S17 is executed, Equation (20) and (21) are used in place of Equation (5). Therefore, the correction damping forces ΔDf and ΔDr can be obtained easily. However, the method of obtaining the correction damping forces is not limited thereto. For example, the correction damping forces ΔDfin to ΔDrout may be obtained as follow. The rest of the third modification of the first embodiment is the same as the first embodiment, and therefore, will not be described repeatedly.

As in the case of the second modification of the first embodiment, in this third modification thereof, the roll damping factors ζ at the front and rear sections of the vehicle are render equal, and the front-wheel side correction roll moment ΔMrf and the rear-wheel side correction roll moment ΔMrr are calculated by use of the above Equations (16) to (19). However, unlike the second modification of the first embodiment, in this third modification of the first embodiment, the same or equal correction damping coefficient is provided for the shock absorbers 10 of the front right and left wheels, and the same or equal correction damping coefficient is provided for the shock absorbers 10 of the rear right and left wheels. That is, the correction damping coefficients of the shock absorbers 10 of the front right and front left wheels are assumed to be ΔCf, and the correction damping coefficients of the shock absorbers 10 of the rear right and rear left wheels are assumed to be ΔCr. When the processing in Step S17 is executed, the following Equations (22) and (23) are used in place of the above Equation (5).

$$\Delta Cf \cdot (Xfind - Xfoutd) \cdot Tf/2 \, \Delta Mrf \quad (22)$$

$$\Delta Cr \cdot (Xrind - Xroutd) \cdot Tr/2 = \Delta Mrr \quad (23)$$

On the basis of the above Equation (22) and (23), the correction damping coefficients ΔCf and ΔCr are calculated by the following Equations (24) and (25), respectively. As shown in the following Equations (26) to (29), the correction damping forces ΔDfin to ΔDrout are represented by making use of the correction damping coefficients ΔCf and ΔCr.

$$\Delta Cf = 2\Delta Mrf/\{(Xfind - Xfoutd) \cdot Tf\} \quad (24)$$

$$\Delta Cr = 2\Delta Mrr/\{(Xrind - Xroutd) \cdot Tr\} \quad (25)$$

$$\Delta Dfin = \Delta Cf \cdot Xfind \quad (26)$$

$$\Delta Dfout = \Delta Cf \cdot Xfoutd \quad (27)$$

$$\Delta Drin = \Delta Cr \cdot Xrind \quad (28)$$

$$\Delta Drout = \Delta Cr \cdot Xroutd \quad (29)$$

After the processing in Step S17, as in the case of the above first embodiment, the CPU proceeds to Step S18 so as to calculate the damping forces Di of the shock absorbers 10 at the present time. The CPU then proceeds to Step S19 so as to calculate the respective target damping forces Di* by adding the correction damping forces ΔDfin to ΔDrout to the damping forces Di. After the processing in Step S19, the CPU proceeds to Step S20 and controls the operations of the corresponding actuators 31 in accordance with the target damping forces Di*, thereby adjusting the degrees of throttling of the corresponding variable throttle mechanisms 30. After the processing in Step S20, the CPU proceeds to Step S21 so as to end the current execution of the roll control program. As in the case of the above first embodiment, in this third modification thereof, rolling sensation during turning can be improved.

In the above-described first embodiment and each modification of thereof, the target roll angle θr* is set to a predetermined value with reference to the target roll angle table in accordance with the lateral acceleration Gy. At this time, the target roll angle θr* is set to the same value irrespective of where the target roll angle θr* increases or decreases. However, when the target roll angle θr* is set, a small amount of hysteresis may be given within a range in which good rolling sensation is ensured, such that the target roll angle θr* is set to different values depending on whether the target roll angle θr* increases or decreases.

Second Embodiment

Next, a second embodiment of the present invention will be described. The electronic controller 40 according to the second embodiment executes a pitching control program shown in FIG. 6, in addition to executing the roll control program shown in FIG. 2. The rest of the second embodiment is the same as the first embodiment, and therefore, will not be described repeatedly.

The pitching control program controls the pitching of the vehicle body BD such that the phase difference between the target roll angle θr* obtained in the first embodiment and the pitching of the vehicle body BD becomes zero. The CPU starts the program at Step S40 and then proceeds to Step S41 so as to read the target roll angle θr* calculated in accordance with the lateral acceleration Gy of the vehicle. Next, it proceeds to Step S42.

Figure 8:
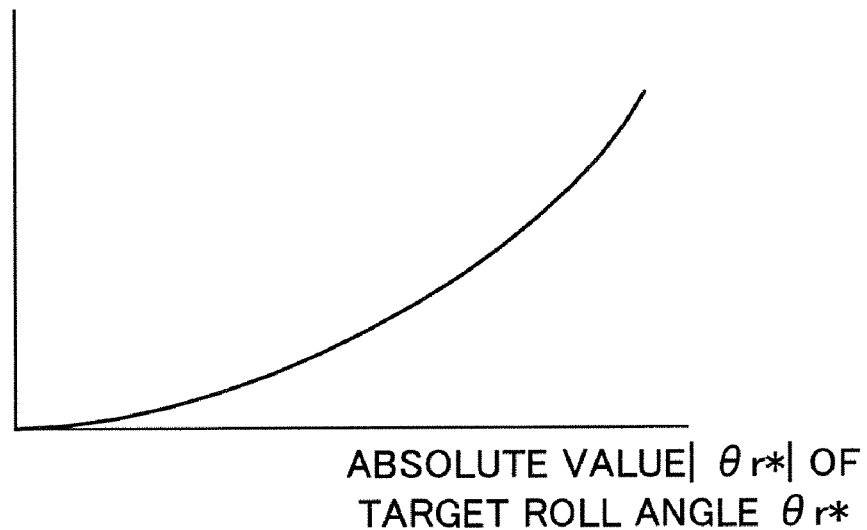
FIG. 8 is a graph relating to the second and third embodiments, and showing a change in target pitch angle with target roll angle, which is stored in a target pitch angle table provided in the electronic controller.

In Step S42, the CPU calculates a target pitch angle θp* by use of the target roll angle θr*. Specifically, the CPU calculates the target pitch angle θp* of the vehicle body BD, which changes depending on the absolute value [θr*] of the target roll angle θr*, with reference to a target pitch angle table stored in the ROM in the electronic controller 40. As shown in FIG. 8, the target pitch angle table stores the target pitch angle θp* determined such that the front of the vehicle lowers by a very small amount during turning. This target pitch angle θp* is uniquely determined on the basis of the target roll angle θr* and nonlinearly increases with the target roll angle θr*. Notably, the target pitch angle θp*. may be calculated by use of a function instead of or in addition to the target pitch angle table. The function represents the target pitch angle θp* which changes in accordance with the target roll angle θr*.

Figure 7:
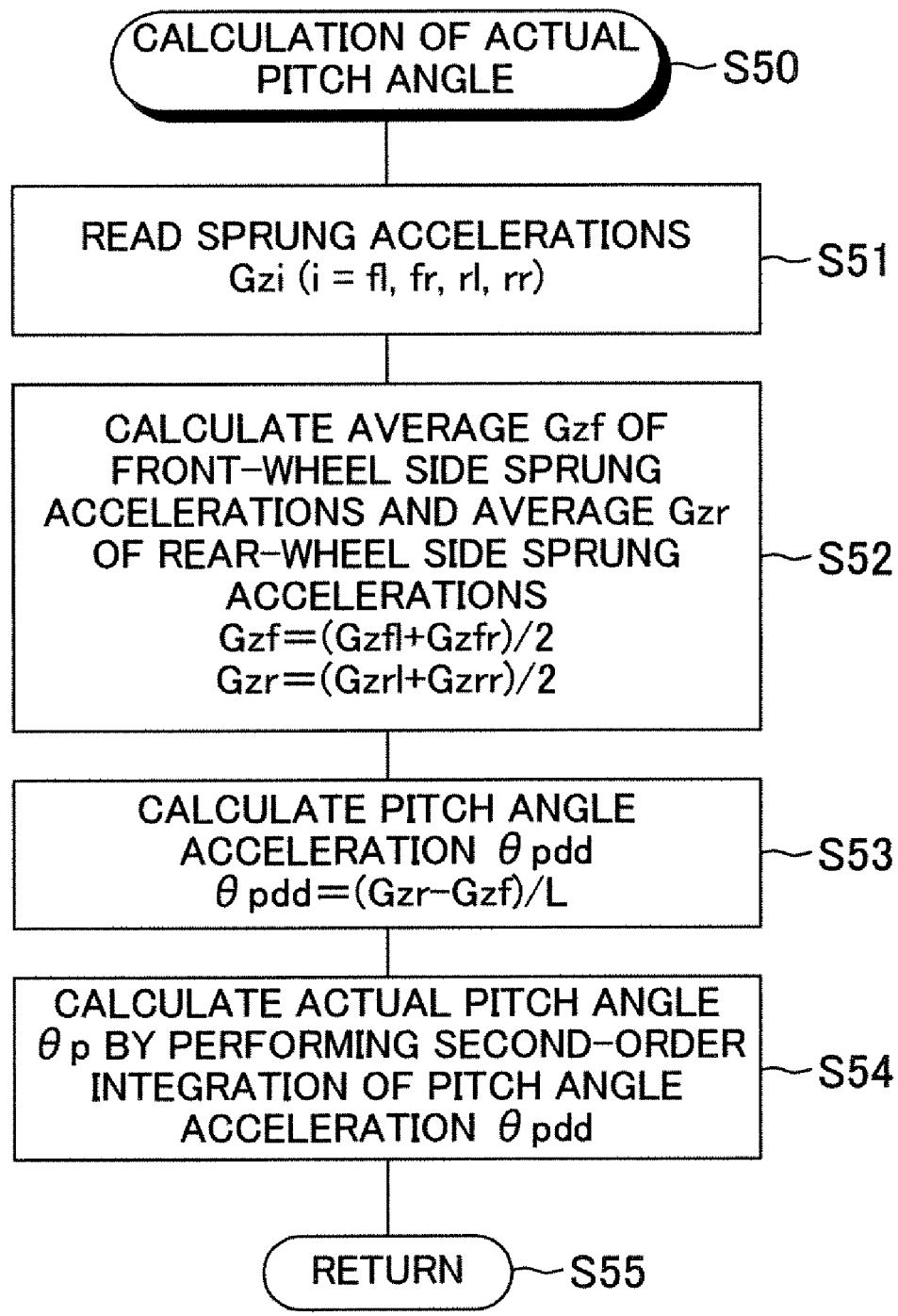
FIG. 7 is a flowchart relating to the second and third embodiments, and showing an actual pitch-angle calculation program executed by the electronic controller shown in FIG. 1.

After the processing in Step S42, the CPU proceeds to Step S43 and executes an actual pitch-angle calculation program so as to determine an actual pitch angle θp. The actual roll-pitch calculation program is designed to calculate an actual pitch angle, which is one physical quantity representing the posture of the vehicle body BD during turning of the vehicle. As shown in FIG. 7, the CPU starts the program at Step S50. It then proceeds to Step S51 so as to read the sprung accelerations Gzfl, Gzfr, Gzrl, and Gzrr respectively detected by the sprung acceleration sensors 41fl, 41fr, 41rl, and 41rr.

In Step S52, the CPU calculates, by use of the following Equations (30) and (31), the average Gzf of the front-wheel side sprung accelerations and the average Gzr of the rear-wheel side sprung accelerations, respectively.

$$Gzf=(Gzfl+Gzfr)/2 \tag{30}$$

$$Gzr=(Gzrl+Gzrr)/2 \tag{31}$$

In Step S53, the CPU uses the following Equation (32) to calculate a pitch angle acceleration θpdd of the vehicle:

$$\theta pdd=(Gzr-Gzf)/L \tag{32}$$

where L represents the wheel base of the vehicle. In Step S54, the CPU performs second-order time integration of the pitch angle acceleration θpdd calculated by use of Equation (32), to thereby calculate the actual pitch angle θp. When the actual pitch angle θp is positive, it means that the front of the vehicle lowers. When the vehicle is turning, the actual pitch angle θp is always positive because of the vehicle structure and the like. After the processing in Step S54, the CPU proceeds to Step S55 and ends the current execution of this actual pitch-angle calculation program.

Figure 6:
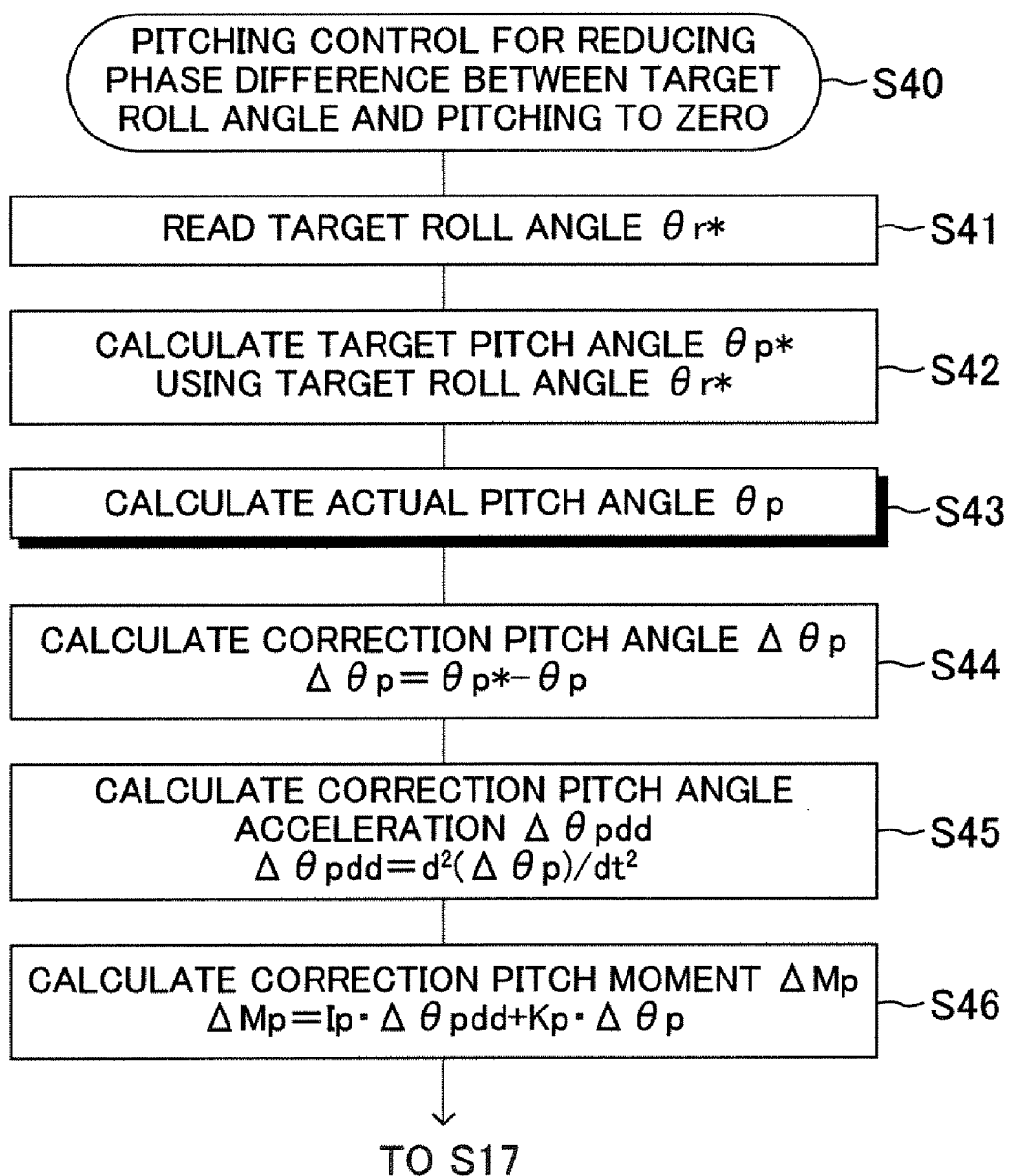
FIG. 6 is a flowchart relating to the second and third embodiments, and showing a pitching control program executed by the electronic controller shown in FIG. 1.

The CPU returns to the pitching control program of FIG. 6. After the processing in Step S43, the CPU proceeds to Step S44 and calculates a correction pitch angle Δθp by subtracting the actual pitch angle θp from the target pitch angle θp* (Δθp=θp*-θp). Next, the CPU proceeds to Step S45 and calculates a correction pitch angle acceleration Δθpdd through second order time-differentiation of the correction pitch angle Δθp (Δθpdd=d²(Δθp)/dt²).

After the processing in Step S45, the CPU proceeds to Step S46 and calculates the correction pitch moment ΔMp required to correct the pitch angle by use of the following Equation (33):

$$\Delta Mp=Ip \cdot \Delta\theta pdd+Kp \cdot \Delta\theta p \tag{33}$$

where Ip represents the inertia moment of the vehicle about the lateral axis passing through the center of gravity of the vehicle body BD; and Kp represents pitch stiffness. When the sign of ΔMp is positive, it means that the front of the vehicle lowers. When the sign of ΔMp is negative, it means that the rear of the vehicle lowers.

After the processing in Step S46, the CPU proceeds to Step S17 of FIG. 2 and calculates the correction damping forces ΔDfin to ΔDrout by using the following Equation (34) and (35) in place of the above Equation (5).

$$(\Delta Cf \cdot Xfind - \Delta Cf \cdot Xfoutd) - Tf/2 + (\Delta Cr \cdot Xrind - \Delta Cr \cdot Xroutd) \cdot Tr/2 = \Delta Mr \tag{34}$$

$$-(\Delta Cf \cdot Xfind + \Delta Cf \cdot Xfoutd) \cdot Lf + (\Delta Cr \cdot Xrind + \Delta Cr \cdot Xroutd) \cdot Lr = \Delta Mp \tag{35}$$

The above Equations (34) and (35) are represented by a matrix as shown in the following Equation (36). By use of the Equation (36), the correction damping coefficient ΔCf on the front wheel side of the vehicle and the correction damping coefficient ΔCr on the rear wheel side of the vehicle are calculated.

$$\begin{pmatrix} (Xfind-Xfoutd) \cdot Tf/2 & (Xrind-Xroutd) \cdot Tr/2 \\ -(Xfind+Xfoutd) \cdot Lf & (Xrind+Xroutd) \cdot Lr \end{pmatrix} \begin{pmatrix} \Delta Cf \\ \Delta Cr \end{pmatrix} = \begin{pmatrix} \Delta Mr \\ \Delta Mp \end{pmatrix} \tag{36}$$

$$\begin{pmatrix} \Delta Cf \\ \Delta Cr \end{pmatrix} = \begin{pmatrix} (Xfind-Xfoutd) \cdot Tf/2 & (Xrind-Xroutd) \cdot Tr/2 \\ -(Xfind+Xfoutd) \cdot Lf & (Xrind+Xroutd) \cdot Lr \end{pmatrix}^{-1} \begin{pmatrix} \Delta Mr \\ \Delta Mp \end{pmatrix} \tag{37}$$

However, conditions Xfind≠Xfoutd and Xrind≠Xroutd must be satisfied in order to establish an inverse matrix in Equation (37). This is because, when Xfind=Xfoutd and Xrind=Xroutd, rolling of the vehicle body BD is not generated, and therefore, there do not exist correction damping coefficients ΔCf and ΔCr which satisfy roll conditions in Equation (37). Further, conditions Xfind≠−Xfoutd and Xrind≠−Xroutd also must be satisfied. This is because, when Xfind=−Xfoutd and Xrind=−Xroutd, pitching of the vehicle body BD is not generated, and therefore, there do not exist correction damping coefficients ΔCf and ΔCr which satisfy pitching conditions in Equation (37). As in the above-described third modification of the first embodiment, the correction damping forces ΔDfin to ΔDrout are respectively represented by Equations (26) to (29) by use of the above-mentioned correction damping coefficients ΔCf and ΔCr.

After the processing in Step S17, as in the case of the above third modification of the first embodiment, the CPU proceeds to Step S18 so as to calculate the damping forces Di of the shock absorbers 10 at the present time. The CPU then proceeds to Step S19 so as to calculate the respective target damping forces Di* by adding the correction damping forces ΔDfin to ΔDrout to the damping forces Di. After the processing in Step S19, the CPU proceeds to Step S20 and controls the operations of the corresponding actuators 31 in accordance with the target damping forces Di*, thereby adjusting the degrees of throttling of the corresponding variable throttle mechanisms 30. After the processing in Step S20, the CPU proceeds to Step S21 so as to end the current execution of the roll control program.

In this second embodiment, first, the target roll angle θr* of the vehicle body BD during turning is set by means of the processing in Step S12 of FIG. 2 in accordance with the lateral acceleration Gy detected by the lateral acceleration sensor 43. Next, in accordance with the set target roll angle θr*, the target pitch angle θp* of the vehicle body BD during turning is calculated by means of the processing in Step S42 of FIG. 6. In order to render the actual pitch angle θp obtained as a result of the processing in Step S43 coincident with the set target pitch angle θp*, the target damping forces Di* of the shock absorbers 10 are set by means of the processing in Steps S44 to S46 and Steps S17 to S19, and then the damping forces Di of the shock absorbers 10 are controlled by means of the processing in Step S20 in accordance with the set target damping forces Di*. By virtue of these steps, the phase of the lateral acceleration Gy acting on the vehicle, the phase of the rolling of the vehicle body BD, and the phase of the pitching of the vehicle body BD coincide with one another during turning, whereby pitching sensation can be improved, while rolling sensation is improve during turning.

In the above-described second embodiment, the target pitch angle θp* is set to a predetermined value with reference to the target pitch angle table in accordance with the target roll angle θr*. In this case, the target pitch angle θp* is set to the same value irrespective of whether the target pitch angle θp* increases or decreases. However, when the target pitch angle θp* is set, a small amount of hysteresis may be given within a range in which good pitching sensation is ensured, such that the target pitch angle θp* is set to the different values depending on whether the target pitch angle θp* increases or decreases.

Further, in the second embodiment, the target pitch angle θp* of the vehicle body is indirectly set by means of the processing in Step S42 on the basis of the target roll angle θr*. However, the target pitch angle θp* may directly set on the basis of the lateral acceleration Gy.

Third Embodiment

Next, a third embodiment of the present invention will be described. The damping force control apparatus according to the third embodiment includes a vehicle speed sensor 45 and a yaw rate sensor 46 as indicated by a broken line in FIG. 1 in addition to the lateral acceleration sensor 43, the steering angle sensor 44 and the like. The vehicle speed sensor 45 detects a vehicle speed V. The yaw rate sensor 46 detects a yaw rate γ. When the yaw rate γ detected by the yaw rate sensor 46 is positive, it means that a counterclockwise angular velocity is generated about the vertical axis of the vehicle which passes through the center of gravity of the vehicle. When the yaw rate γ detected by the yaw rate sensor 46 is negative, it means that a clockwise angular velocity is generated about the vertical axis of the vehicle which passes through the center of gravity of the vehicle. Further, the electronic controller 40 according to the third embodiment executes a damping force control program shown in FIG. 9, in addition to the roll control program shown in FIG. 2 and the pitching control program shown in FIG. 6. The rest of the third embodiment is the same as the first embodiment.

The roll control programs according to the first embodiment and the modifications thereof control the damping forces of the shock absorbers 10 such that the phase difference between the lateral acceleration Gy acting on the vehicle and the roll angle θr of the vehicle body BD becomes zero. The roll control program according to the second embodiment controls the damping forces of the shock absorbers 10 such that the phase difference between the roll angle θr and the pitch angle θp of the vehicle body BD becomes zero. The damping force control program according to the third embodiment shown in FIG. 9 controls the damping forces of the shock absorbers 10 such that the rear-wheel side vertical displacement of vehicle body BD becomes zero, while performing both the damping force controls described above.

The CPU starts the damping force control program at Step S60. It then proceeds to Step S61 so as to read the vehicle speed V detected by the vehicle speed sensor 45, the yaw rate γ detected by the yaw rate sensor 46, and the lateral acceleration Gy detected by the lateral acceleration sensor 43. The CPU then proceeds to Step S62. In the Step S62, a side slip angular velocity dβ/dt of the center of gravity of the vehicle, where β is the side slip angle of the center of gravity of the vehicle, is calculated using the following Equation (38) on the basis of a dynamic equation of lateral direction at the center of gravity of the vehicle.

$$d\beta/dt = (Gy/V) - \gamma \tag{38}$$

Next, the CPU proceeds to Step S63 so as to calculate the side slip angle β of the center of gravity of the vehicle by performing time integration of the side slip angular velocity dβ/dt of the center of gravity of the vehicle calculated in Step S62. The CPU proceeds to Step S64 so as to calculate the slip angle βr of the rear wheels by use of the following Equation (39) in consideration of the fact that the rear wheels have a velocity component corresponding to the velocity component of the center of gravity of the vehicle and a velocity component stemming from rotation about the center of gravity of the vehicle.

$$\beta r = (\gamma \cdot Lr/V) - \beta \tag{39}$$

In Equation (39), Lr represents the distance between the center of gravity of the vehicle and the rear axle shaft.

The CPU proceeds to Step S65 so as to calculate, from the rear-wheel slip angle βr calculated in Step S64, an estimated rear-wheel lateral force Yr in accordance with the following Equation (40):

$$Yr = Cr \cdot \beta r/(To \cdot S + I) \tag{40}$$

where Cr represents the cornering force of the rear wheels per unit side slip angle within a region in which cornering force of the rear wheels generally increases in proportion to the side slip angle, that is, cornering power of the rear wheels. Further, Tr represents the time constant of the tires of the rear wheels for taking into consideration a time delay in generation of a lateral force in relation to an elastic deformation of the tires.

The CPU proceeds to Step S66 so as to calculate an estimated jack-up power Jr acting on the rear wheels of the vehicle body BD on the basis of the following Equation (41) using the estimated rear-wheel lateral force Yr calculated in Step S65:

$$Jr = Kjr \cdot Yr^2 \quad (41)$$

where Kjr represents a jack-up coefficient determined in consideration of the geometry change of the suspension systems for the rear wheels.

After the processing in Step S66, the CPU proceeds to Step S17 of FIG. 2 and calculates the correction damping forces $\Delta Cfin \cdot Xfind$, $\Delta Cfout \cdot Xfoutd$, $\Delta Crin \cdot Xrind$, and $\Delta Crout \cdot Xroutd$ by using the following Equation (42) to (45) in place of the above Equation (5):

$$(\Delta Cfin \cdot Xfind - \Delta Cfout \cdot Xfoutd) \cdot Tf/2 = \Delta Mrf \quad (42)$$

$$(\Delta Crin \cdot Xrind - \Delta Crout \cdot Xroutd) \cdot Tr/2 = \Delta Mrr \quad (43)$$

$$-(\Delta Cfin \cdot Xfind + \Delta Cfout \cdot Xfoutd) \cdot Lf = \Delta Mp \quad (44)$$

$$\Delta Crin \cdot Xrind + \Delta Crout \cdot Xroutd = -Jr \quad (45)$$

where $\Delta Cfin$, $\Delta Cfout$, $\Delta Crin$, and $\Delta Crout$ respectively represent the correction damping coefficients of the front wheel on the radially inner side of the turning locus, the front wheel on the radially outer side of the turning locus, the rear wheel on the radially inner side of the turning locus, and the rear wheel on the radially outer side of the turning locus. As in the case of the above-described second modification of the first embodiment, Equations (42) and (43) are derived under the assumption that the roll damping factors $\zeta$ at the front and the rear sections of the vehicle are equal.

On the basis of the above Equations (42) to (45), the correction damping forces $\Delta Cfin \cdot Xfind$ to $\Delta Crout \cdot Xroutd$ of the four wheels are calculated by the following Equation (46).

$$\begin{pmatrix} \Delta Cfin \cdot Xfind \\ \Delta Cfout \cdot Xfoutd \\ \Delta Crin \cdot Xrind \\ \Delta Crout \cdot Xroutd \end{pmatrix} = \begin{pmatrix} \left(\frac{\Delta Mrf}{Tf} - \frac{\Delta Mp}{2Lf}\right) \\ -\left(\frac{\Delta Mrf}{Tf} + \frac{\Delta Mp}{2Lf}\right) \\ \left(\frac{\Delta Mrr}{Tr} - \frac{Jr}{2}\right) \\ -\left(\frac{\Delta Mrr}{Tr} - \frac{Jr}{2}\right) \end{pmatrix}$$

$$= \begin{pmatrix} \frac{1}{Tf} & 0 & -\frac{1}{2Lf} & 0 \\ -\frac{1}{Tf} & 0 & -\frac{1}{2Lf} & 0 \\ 0 & \frac{1}{Tr} & 0 & \frac{1}{2} \\ 0 & -\frac{1}{Tr} & 0 & \frac{1}{2} \end{pmatrix} \begin{pmatrix} \Delta Mrf \\ \Delta Mrr \\ \Delta Mp \\ -Jr \end{pmatrix} \quad (46)$$

After the processing in Step S17, as in the case of the above-described second embodiment, the CPU proceeds to Step S18 so as to calculate the damping forces Di of the shock absorbers 10 at the present time. The CPU then proceeds to Step S19 so as to calculate the target damping forces Di* by adding the correction damping forces $\Delta Cfin \cdot Xfind$ to $\Delta Crout \cdot Xroutd$ to the damping forces Di. After the processing in Step S19, the CPU proceeds to Step S20 and controls the operations of the corresponding actuators 31 in accordance with the target damping forces Di*, thereby adjusting the degrees of throttling of the corresponding variable throttle mechanisms 30. After the processing in Step S20, the CPU proceeds to Step S21 so as to end the current execution of the roll control program.

Figure 9:
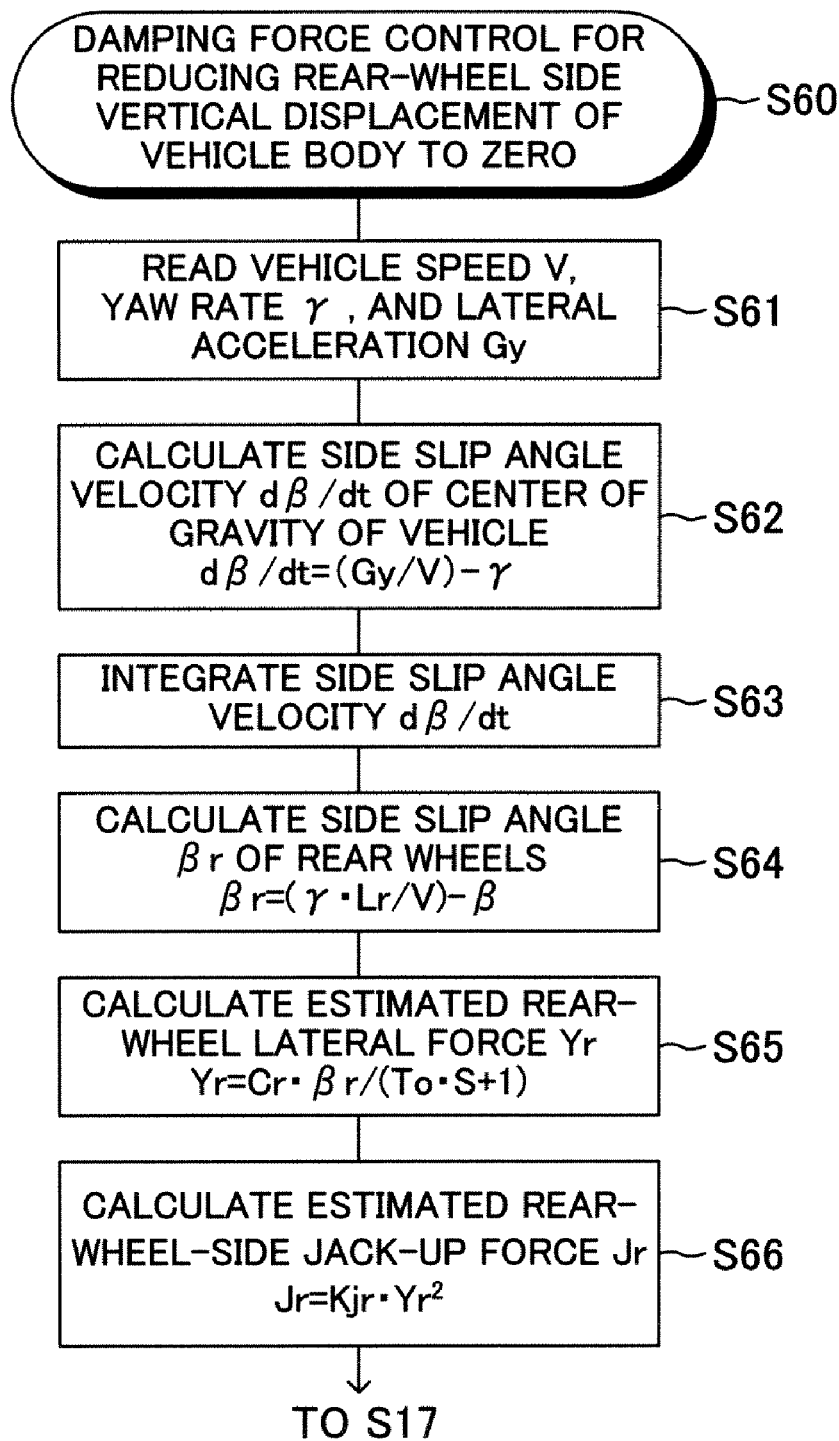
FIG. 9 is a flowchart relating to the third embodiment, and showing a damping force control program executed by the electronic controller shown in FIG. 1.

In the third embodiment, the estimated rear-wheel-side jack-up power Jr acting on the vehicle body BD during turning is calculated by means of Step S61 to Step S66 of FIG. 9. Next, when the processing in Step S17 of FIG. 2 is executed, not only the conditional equation used in the above-described first and second embodiments, but also the conditional equation (see Equation (45)) for setting the direction of the rear-wheel-side target damping force such that the estimated rear-wheel-side jack-up power Jr is cancelled. The processing of Step S18 and subsequent steps shown in FIG. 2 controls the damping forces Di of the shock absorbers 10 in accordance with the set target damping forces Di*. Thus, it becomes possible to maintain the vehicle body BD in a front-lowered state, while reducing the rear-wheel side vertical displacement of the vehicle body BD to zero. As a result, the steering stability can be improved, while rolling sensation and pitching sensation during turning are improved.

In the third embodiment, through execution of the damping force control program shown in FIG. 9, the estimated rear-wheel-side jack-up power Jr is calculated, and the rear-wheel-side target damping force is set to produce a damping force in the direction opposite the direction of the estimated rear-wheel-side jack-up power Jr. As a result, through control of the damping forces Di of the shock absorbers 10, it becomes possible to maintain the vehicle body BD in a front-lowered state, while reducing the rear-wheel side vertical displacement of vehicle body BD to zero. Notably, in addition to the estimated rear-wheel-side jack-up power Jr, an estimated front-wheel-side jack-up power Jf may be taken into consideration.

In this case, for example, the total vertical input force acting on the front-wheel side of the vehicle body BD is calculated by adding the estimated front-wheel-side jack-up power Jf to the damping forces currently generated by the front-wheel-side shock absorbers 10. Next, a total vertical input force acting on the rear-wheel side of the vehicle body BD is calculated such that the total vertical input acting on the rear-wheel side cancels a rotational moment which is generated about the lateral axis passing through the center of gravity of the vehicle body BD by the total vertical input force acting on the front-wheel side of the vehicle body BD. Finally, the rear-wheel side target damping force is calculated by subtracting the estimated rear-wheel-side jack-up power Jr from the total vertical input force acting on the rear-wheel side of the vehicle body BD.

According to this modification, the vehicle body BD can be maintained in a front-lowered state by means of balancing the vertical input forces acting on the front-wheel side and the rear-wheel side, respectively, of the vehicle body BD. As a result, the steering stability can be improved, while rolling sensation and pitching sensation during turning are improved.

Although the embodiments of the present invention and their modifications have been described, the present invention is not limited to the above-described embodiments and modifications, and the embodiments and modifications may be modified in various ways without departing from the scope of the present invention.

For example, in the first to third embodiments and the modifications of the first embodiment, the roll angle acceleration θrdd and the pitching angle acceleration θpdd of the vehicle are first calculated on the basis of the sprung accelerations Gzfl, Gzfr, Gzrl, and Gzrr respectively detected by the sprung acceleration sensors 41*fl*, 41*fr*, 41*rl*, and 41*rr*; and the actual roll angle θr and the actual pitch angle θp are then calculated by performing second-order time integration of the calculated roll angle acceleration θrdd and pitching angle acceleration θpdd, respectively. However, the method of obtaining the actual roll angle or and the actual pitch angle θ is not limited thereto. For example, the actual roll angle θr and the actual pitch angle θp are calculated on the basis of the strokes Xi (i=fl, fr, rl, and rr) detected by the vehicle height sensors 42*fl*, 42*fr*, 42*rl*, and 42*rr*.

Further, in the first to third embodiments and the modifications of the first embodiment, in order to obtain the respective correction damping forces, the processing of Step S17 of FIG. 2 is performed in different manners. That is, in the first embodiment, the same or equal correction damping force is provided for the shock absorbers 10 of the four wheels; in the first modification of the first embodiment, the same or equal correction damping coefficient is provided for the shock absorbers 10 of the four wheels; in the second modification of the first embodiment, the roll damping factors, at the front and rear sections of the vehicle are rendered equal and the same or equal correction damping force is provided for the shock absorbers 10 of the front right and left wheels of the vehicle and the same or equal correction damping force is provided for the shock absorbers 10 of the rear right and left wheels; and in the third modification of the first embodiment, the roll damping factors ζ at the front and rear sections of the vehicle are rendered equal, and the same or equal correction damping coefficient is provided for the shock absorbers 10 of the front right and left wheels and the same or equal correction damping coefficient is provided for the shock absorbers 10 of the rear right and left wheels. Further, in the second embodiment, the same or equal correction damping coefficient is provided for the shock absorbers 10 of the front right and left wheels and the same or equal correction damping coefficient is provided for the shock absorbers 10 of the rear right and left wheels; and in the third embodiment, the roll damping factors ζ at the front and rear sections of the vehicle are rendered equal and different correction damping coefficients are individually provided for the shock absorbers 10. However, the correction damping forces can be calculated by use of any of various methods performed under assumptions other than the above-described assumptions.

Further, in the second and third embodiment, the roll control program shown in FIG. 2 and the pitching control program shown in FIG. 6 are executed in order to control rolling and pitching, which are posture changes of the vehicle body BD, to thereby improve rolling sensation and pitching sensation during turning. However, the present invention may be configured such that the roll control program shown in FIG. 2 is eliminated, and only the pitching control program shown in FIG. 6 is executed.

In the above-described embodiments and modifications, rolling and pitching are taken as example posture changes of the vehicle body BD which affect the behavior of the vehicle body BD during turning. However, the present invention can be applied to other posture changes of the vehicle body BD in a manner similar to that in the case of the roll control and the pitching control.

What is claimed is:

1. A damping force control apparatus for a vehicle in which four wheels are suspended by respective suspension systems including respective shock absorbers, and damping forces of the shock absorbers are controlled individually in accordance with turning conditions of the vehicle, the damping force control apparatus comprising:

wheel stroke detection means for detecting respective strokes of the four wheels in relation to a vehicle body;

lateral acceleration detection means for detecting a lateral acceleration acting on the vehicle during turning;

plurality of sprung acceleration detection means for detecting respective sprung accelerations at positions that correspond to the four wheels;

target-posture setting means for setting a target posture of the vehicle body during turning in accordance with the lateral acceleration detected by the lateral acceleration detection means;

actual posture determining means for determining an actual posture of the vehicle body during turning in accordance with the sprung accelerations detected by the plurality of sprung acceleration detection means;

correction posture determining means for determining a correction posture by comparing the target posture and the actual posture;

target-damping-force setting means for setting target damping forces which the shock absorbers are required to generate so as to render the actual posture of the vehicle body determined by the actual posture determining means coincident with the target posture set by the target-posture setting means, wherein the target damping forces are set in accordance with the correction posture and a stroke speed that is based on the strokes; and damping-force control means for controlling the damping forces of the shock absorbers in accordance with the target damping forces set by the target-damping-force setting means.

2. The damping force control apparatus for a vehicle according to claim 1, wherein
the actual posture is an actual roll angle of the vehicle body about a longitudinal axis of the vehicle, and
the target posture is a target roll angle of the vehicle body about the longitudinal axis which increases with the detected lateral acceleration and is uniquely determined by the lateral acceleration.

3. The damping force control apparatus for a vehicle according to claim 1, wherein
the actual posture is an actual pitch angle of the vehicle body about a lateral axis of the vehicle, and
the target posture is a target pitch angle of the vehicle body about the lateral axis which increases with the detected lateral acceleration and is uniquely determined by the lateral acceleration.

4. The damping force control apparatus for a vehicle according to claim 1,
wherein the actual posture is based on an actual roll angle of the vehicle body about a longitudinal axis of the vehicle and an actual pitch angle of the vehicle body about a lateral axis of the vehicle, and
the target posture is based on a target roll angle of the vehicle body about the longitudinal axis which increases with the detected lateral acceleration and is uniquely determined by the lateral acceleration and a target pitch angle of the vehicle body about the lateral axis which increases with the detected lateral acceleration and is uniquely determined by the lateral acceleration.

5. The damping force control apparatus for a vehicle according to claim 1, wherein the target-damping-force setting means includes:

jack-up-force calculation means for calculating a jack-up force acting from the suspension systems to the vehicle body during turning, and jack-up-corresponding-target-damping-force calculation means for calculating the target damping forces in consideration of the jack-up force calculated by the jack-up-force calculation means.

6. The damping force control apparatus for a vehicle according to claim 2, wherein the correction posture is a correction roll angle based on the actual roll angle and the target roll angle, and wherein the target posture setting means includes means for determining a correction roll moment in accordance with the correction roll angle, a roll stiffness of the vehicle, and an inertia moment of the vehicle about the longitudinal axis of the vehicle.

7. The damping force control apparatus for a vehicle according to claim 6, wherein the target posture setting means includes means for determining a correction dampening force in accordance with the correction roll moment, and wherein the target damping forces are further set in accordance with the correction dampening force.

8. The damping force control apparatus for a vehicle according to claim 3, wherein the correction posture is a correction pitch angle based on the actual pitch angle and the target pitch angle, and wherein the target posture setting means includes means for determining a correction pitch moment in accordance with the correction pitch angle, a pitch stiffness of the vehicle, and an inertia moment of the vehicle about the lateral axis of the vehicle.

9. The damping force control apparatus for a vehicle according to claim 8, wherein the target posture setting means includes means for determining a correction dampening force in accordance with the correction pitch moment, and wherein the target damping forces are further set in accordance with the correction dampening force.

10. The damping force control apparatus for a vehicle according to claim 4, wherein the target posture setting means includes means for determining a correction roll moment in accordance with the actual roll angle, the target roll angle, a roll stiffness of the vehicle, and an inertia moment of the vehicle about the longitudinal axis of the vehicle means for determining a correction pitch moment in accordance with the actual pitch angle, the target pitch angle, a pitch stiffness of the vehicle, and an inertia moment of the vehicle about the lateral axis of the vehicle.

11. The damping force control apparatus for a vehicle according to claim 10, wherein the target posture setting means includes means for determining a correction dampening force in accordance with the correction roll moment and the correction pitch moment, and wherein the target damping forces are further set in accordance with the correction dampening force.

12. A damping force control apparatus for a vehicle in which four wheels are suspended by respective suspension systems including respective shock absorbers, and damping forces of the shock absorbers are controlled individually in accordance with turning conditions of the vehicle, the damping force control apparatus comprising:

vehicle height sensors that detect strokes of the four wheels in relation to a vehicle body;

a lateral acceleration sensor that detects a lateral acceleration acting on the vehicle during turning;

plurality of sprung acceleration sensors that respectively detect sprung accelerations at positions that correspond to the four wheels; and an electronic controller, wherein the electronic controller is configured to set a target posture of the vehicle body during turning in accordance with the lateral acceleration detected by the lateral acceleration sensor, the electronic controller is configured to determine an actual posture of the vehicle body during turning in accordance with the sprung accelerations detected by the plurality of sprung acceleration sensors, the electronic controller is configured to determine a correction posture by comparing the target posture and the actual posture, the electronic controller is configured to set a target damping forces which the shock absorbers are required to generate so as to render the actual posture of the vehicle body coincident with the target posture, the target damping forces are set in accordance with the correction posture and a stroke speed that is based on the strokes, and the electronic controller is configured to control the damping forces of the shock absorbers in accordance with the target damping forces.

13. A damping force control apparatus for a vehicle in which four wheels are suspended by respective suspension systems including respective shook absorbers, and damping forces of the shock absorbers are controlled individually in accordance with turning conditions of the vehicle, the damping force control apparatus comprising:

roll angle detection means for detecting an actual roll angle of the vehicle body about a longitudinal axis of the vehicle;

pitch angle detection means for detecting an actual pitch angle of the vehicle body about a lateral axis of the vehicle;

lateral acceleration detection means for detecting a lateral acceleration acting on the vehicle during turning;

target roll angle setting means for setting a target roll angle of the vehicle body about the longitudinal axis of the vehicle in accordance with the lateral acceleration detected by the lateral acceleration detection means, the target roll angle increasing with the detected lateral acceleration;

target pitch angle setting means for setting a target pitch angle of the vehicle body about the lateral axis of the vehicle in accordance with the target roll angle set by the target roll angle setting means, the target pitch angle increasing with the set target roll angle;

target-damping-force setting means for setting target damping forces which the shock absorbers are required to generate so as to render the actual roll angle detected by the roll angle detection means and the actual pitch angle detected by the pitch angle detection means coincident with the target roll angle set by the target roll angle setting means and the target pitch angle set by the target pitch angle setting means respectively; and damping-force control means for controlling the damping forces of the shock absorbers in accordance with the target damping forces set by the target-damping-force setting means.

14. The damping force control apparatus for a vehicle according to claim 13, wherein the target-damping-force setting means includes:

jack-up-force calculation means for calculating a jack-up force acting from the suspension systems to the vehicle body during turning, and jack-up-corresponding-target-damping-force calculation means for calculating the target damping forces in consideration of the jack-up force calculated by the jack-up-force calculation means.

* * * * *